United States Patent [19]

Palty et al.

[11] 4,197,152
[45] Apr. 8, 1980

[54] ATTACHING SELF-SUPPORTING EMISSIVE FILM TO CATHODE SUPPORT

[75] Inventors: George Palty; Kenneth Speigel, both of Seneca Falls, N.Y.

[73] Assignee: GTE Sylvania Incorporated, Stamford, Conn.

[21] Appl. No.: 20,589

[22] Filed: Mar. 14, 1979

[51] Int. Cl.$^2$ .............................................. C09J 5/02
[52] U.S. Cl. .................................. 252/364; 313/355; 156/309.3
[58] Field of Search ............... 156/307, 308, 326, 295; 313/346 R, 355

[56] References Cited

U.S. PATENT DOCUMENTS

| | | | |
|---|---|---|---|
| 2,986,671 | 5/1961 | Kearstetter | 313/346 R |
| 2,998,052 | 8/1961 | Roeben | 313/346 R X |
| 3,223,569 | 12/1965 | McKeirnan | 156/294 |
| 3,278,354 | 10/1966 | Wennin | 156/307 X |

*Primary Examiner*—David A. Simmons
*Attorney, Agent, or Firm*—Thomas H. Buffton

[57] ABSTRACT

In one aspect of the invention a process for affixing a self-supporting film of emissive materials in a binder to a cathode support member to provide a cathode for a cathode ray tube includes the steps of depositing at least one drop of a liquid mixture containing a solvent for the binder of the film onto a cathode support member, contacting the liquid mixture with the self-supporting film, and preferentially evaporating the liquid mixture to cause the binder of the film to affix the film to the cathode support member.

In another aspect of the invention, an improved liquid mixture for affixing a self-supporting film of emissive materials in a binder to a cathode support member includes at least two liquids miscible in all proportions with one liquid essentially a non-solvent and another higher boiling liquid a solvent for the binder of the film.

9 Claims, 4 Drawing Figures

ATTACHING SELF-SUPPORTING EMISSIVE FILM TO CATHODE SUPPORT

TECHNICAL FIELD

This invention relates to cathodes for cathode ray tubes and more particularly to a method and a solvent mixture suitable for affixing a self-supporting film of emissive materials to a cathode support member.

CROSS REFERENCE TO OTHER APPLICATIONS

This application includes information disclosed but not claimed in a concurrently filed application bearing Attorney's Docket No. 21,712 entitled "Attaching Self-Supporting Emissive Film To Cathode Support," and filed in the names of the inventors of the present application.

BACKGROUND ART

The fabrication of self-supporting films of electron emissive materials suspended in a binder is well known and is discussed in U.S. Pat. No. 2,974,364 assigned to the Assignee of the present application. It is also well known that such self-supporting films are readily cut to size and affixed to a cathode support member to provide a cathode structure. Such procedures are set forth and discussed in U.S. Pat. Nos. 2,986,671 and 3,223,569 for example.

Further, it is known that cathodes for cathode ray tubes may be fabricated by a process wherein a cathode support member is wetted with a thin layer of solvent for the binder of a self-supporting film of emissive materials. Then, a circle or some other configuration is stamped or cut out of the self-supporting film and placed in contact with the solvent wetted cathode support member. Thereupon, the solvent is evaporated, the film is slightly dissolved by the solvent at the interface surface and affixed to the cathode support member to provide a cathode for a cathode ray tube.

Although the above-described process has been and still is employed with varying results, it has been found that serious deficiencies exist in the above-described and known techniques. More specifically, it has been found that centering of the films on the cathode support member, adherence of the film to the support member, and densification of the film by the solvent are all problems encountered in fabricating cathodes for cathode ray tubes.

For example, one known cathode fabricating technique provides for wetting of the cathode support member with a solvent for the binder of the self-supporting film. However, it has been found that it is most difficult to provide a uniform and consistent layer of solvent on the support member. As a result, incomplete coverage by the solvent causes poor adherence of the film with the edges of the film tending to lift from the support member.

On the other hand, if an excess of solvent is present on the cathode support member the solvent dissolves too much of the film and, upon drying, densification of selected parts of the film are encountered. As a result, the electron emissive capabilities of the cathode are deleteriously affected.

Also, one known technique for fabricating cathodes for cathode ray tubes provides for stamping a film circle from a larger film strip and blowing the stamped film circle onto a solvent wetted cathode support member. However, it has been found that it is impractical, if not nearly impossible, to blow the film circle in a manner to achieve repetitive landing thereof in an exact location such as the center of the cathode support member.

More specifically, it has been found that a thin layer of solvent on the cathode support member does not provide the buoyancy and surface tension necessary to "float" the film circle. Thus, the film circle remains at the landing location and is often undesirably not centered on the support member. Obviously, such conditions are undesirable and do not provide uniform cathodes or uniform cathode ray tubes.

OBJECTS AND SUMMARY OF THE INVENTION

It is an object of the present invention to overcome the above-mentioned disadvantages of the prior art. Another object of the invention is to provide an enhanced cathode for a cathode ray tube. Still another object of the invention is to provide an improved process for fabricating cathodes for cathode ray tubes. A further object of the invention is to provide a solvent mixture whereby attachment of a film to a cathode support member is enhanced.

These and other objects, advantages and capabilities are achieved in one aspect of the invention by a process wherein at least a drop of a solvent mixture is deposited onto a cathode support member, a self-supporting film of emissive materials in a binder is floated on the drop of solvent mixture, and the solvent mixture is preferentially evaporated to cause attachment of the film to the cathode support member.

In another aspect of the invention, an improved mixture of solvents suitable to the above cathode fabrication process includes at least two liquids miscible in all proportions with one liquid essentially a non-solvent and another liquid higher boiling and a solvent for the binder of the self-supporting film.

BEST MODE FOR CARRYING OUT THE INVENTION

For a better understanding of the present invention, together with other and further objects, advantages and capabilities thereof, reference is made to the following disclosure and appended claims in conjunction with the accompanying drawings.

Figure 1:
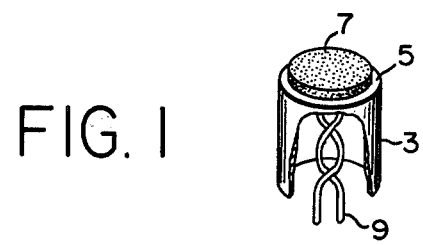
FIG. 1 illustrates a cathode for a cathode ray tube wherein a self-supporting film of emissive materials is affixed to a cathode support member.

Referring to the drawings, FIG. 1 illustrates a cathode for a cathode ray tube. Herein, a cathode support member 3 is formed to provide a relatively flat surface 5 whereon a self-supporting film 7 of electron emissive materials in a binder is affixed. The film 7 is centered on the flat surface 5 and a heating element 9 is disposed within the cathode support member 3 in a manner well known in the art.

As to the self-supporting film of electron emissive materials 7, a preferred binder is ethyl cellulose although acrylic and nitrocellulose binders should work equally as well as binders for these and other solids. Preferably, a film includes alkaline earth carbonates, such as the triple carbonates of barium, calcium and strontium, in an ethyl cellulose binder. The binder may be any one of a number of binder compositions as disclosed in U.S. Pat. No. 2,986,671. Moreover, a preferred binder solution includes ethyl cellulose, toluene, alcohol, ethylene carbonate, ethyl acetate, barium nitrate, and diethylene glycol monobutyl ether known by the trade name of butyl "Carbitol".

A solvent mixture suitable for affixing a self-supporting film to a cathode support member includes at least two liquids miscible in all proportions. One of the two liquids provides little or no solvating action on the binder of the self-supporting film. The other of the two liquids is a higher boiling liquid and a solvent for the binder of the self-supporting film. Moreover, the surface tension of the solvent mixture, prior to evaporation, must be relatively high as will be explained hereinafter.

More specifically, a suitable solvent mixture for an ethyl cellulose self-supporting film or a self-supporting film with an ethyl cellulose binder system would include water and ethylene glycol monobutyl ether known by the trade name as butyl "Cellosolve". The water would be in the range of about 70–90% by weight while the butyl "Cellosolve" would be in the range of about 10–30% by weight. Moreover, one preferred embodiment includes a solvent mixture of about 85% by weight water and about 15% by weight of butyl "Cellosolve". Also, the self-supporting film is in the form of a stamped circle of ethyl cellulose film having a diameter of about 0.070-inch and a thickness of about 0.002-inch.

Figure 2:
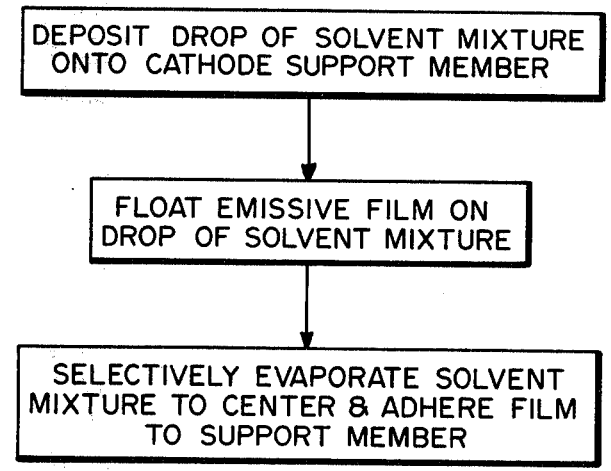
FIG. 2 is a flow chart illustrating a preferred process for affixing the self-supporting film of emissive materials to the cathode support member.

As to a suitable process for fabricating a cathode for a cathode ray tube, reference is made to the flow chart of FIG. 2. Therein, at least one rounded drop of a suitable solvent mixture, such as described above, is deposited onto the flat surface, 5 of FIG. 1, of a cathode support member 3. At least one rounded drop of solvent mixture or an amount at least sufficient to initially "float" an applied film is a minimum requirement. However, amounts greater than a rounded drop have not proven to be deleterious or harmful. Thus, a solvent mixture in an amount sufficient to completely wet the flat surface 5 and sufficient to "float" an applied circle of self-supporting film is provided.

Then a stamped circle of self-supporting film 7 of a given desired size is brought into contact with the drop of solvent mixture on the flat surface 5 of the cathode support member 3. In other words, a circle or disc of self-supporting film 7 is "floated" on the rounded drop of solvent mixture on the surface of the cathode support member. For example, one known technique provides a stamped disc of self-supporting film which is blown into contact with the rounded drop of solvent mixture by an air jet. However, other techniques are equally appropriate so long as the film is brought into contact with the rounded drop of solvent mixture.

Following, the cathode support member with the disc of self-supporting film initially "floating" on the rounded drop of solvent mixture is heated in an amount sufficient to preferentially evaporate the liquids of the solvent mixture. Specifically, heat is applied in an amount sufficient to evaporate mainly the lower boiling liquid wherein the disc of self-supporting film is not appreciably soluble. Thereafter, additional heat is added in an amount to evaporate the higher boiling liquid, wherein the binder of the film is soluble, and causes the binder in the film to affix the film to the cathode support member.

Figure 3:
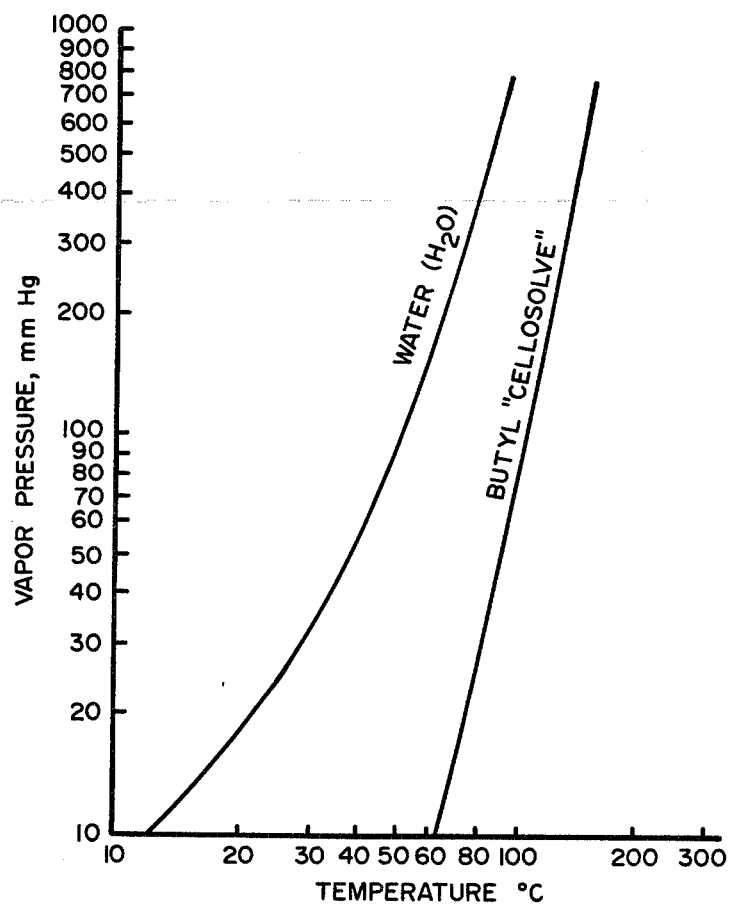
FIG. 3 graphically illustrates a comparison of vapor pressure and temperatures for liquids suitable to a solvent mixture of the invention.

As a basis for a specific example, reference is made to the Vapor Pressure vs. Temperature graph of FIG. 3. Therein is graphically illustrated the vapor pressure-temperature characteristics of suitable liquids for a solvent mixture such as water and "Butyl Cellosolve" or ethylene glycol monobutyl ether. Also, a self-supporting film having a binder, such as ethyl cellulose, is suitable to the above-described solvent mixture.

Specifically, an aqueous solution of butyl Cellosolve includes about 85% by weight of water and about 15% by weight of ethylene glycol monobutyl ether and provides a suitable solvent mixture. Also, a self-supporting film of electron emissive carbonates in an ethyl cellulose binder, has a circle or disc stamped therefrom of a diameter of about 0.070-inch and a thickness of about 0.002-inch.

A rounded drop of the solvent mixture is applied to the cathode support member. Then, the film disc is brought into contact with or "floated" on the rounded drop of solvent mixture. Thereafter, heat is applied thereto in an amount sufficient to raise the temperature of the solvent mixture to about 80° to 100° C. whereupon all or at least a major portion of the water is evaporated and a relatively small portion of the ethylene glycol monobutyl ether or butyl "Cellosolve" is evaporated. Then, additional heat may be provided to raise the temperature of the butyl "Cellosolve" to about 170° C. whereupon all, or practically all, of the butyl "Cellosolve" is evaporated and the binder of the film affixes the film to the cathode support member.

It is to be noted that the solvent mixture, as compared with a single solvent, permits a desired sufficient contact thereof with the film without rapid deterioration of the film since a relatively large portion of the solvent mixture does not serve as a solvent for the binder of the film. In other words, a relatively large quantity of solvent mixture may contact the film without rapid dissolution of the film since the solvent mixture includes a large percentage of water which is not a solvent for the film binder.

Also, the utilization of a rounded drop of solvent mixture provides a buoyancy and surface tension which permits the disc of self-supporting film to initially "float" and center itself on the rounded drop and on the cathode support member. Even though the initial placement or contact of the film and rounded drop of solvent mixture is not at the center of the support member, the buoyancy and surface tension of the solvent mixture serves to provide a "centering" capability.

Figure 4:
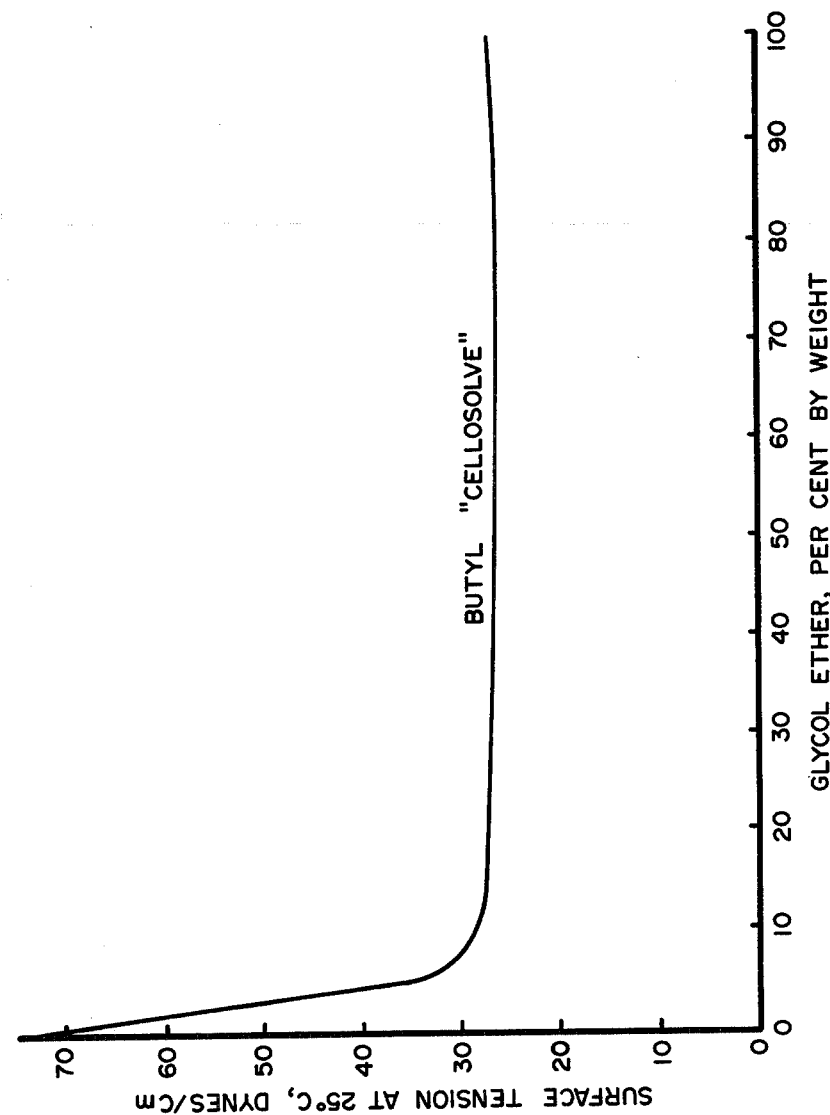
FIG. 4 graphically illustrates the surface tension of a solvent mixture of the liquids of FIG. 3.

This "centering" capability is the initial buoyancy force and surface tension of the solvent mixture which tends to move the film disc to the top and center of the rounded drop of the mixture. As can be seen in the graphic illustration of FIG. 4, a solvent mixture of water and about 15% by weight of butyl "Cellosolve" would have a surface tension of about 27 dynes per centimeter. Preferably, a mixture having a surface tension of at least 20 dynes per centimeter has been found appropriate and suitable to the cathode fabrication process.

Further, the successive evaporation steps permits controlled dissolving of the surface of the film. In other words the water which does not appreciably dissolve the binder of the film is first evaporated. Thereafter, added heat is applied and the butyl "Cellosolve" which is a solvent for the binder of the film is removed whereupon the binder of the film affixes the film to the cathode support member. In this manner undesired densification of the film is prohibited while complete coverage of the support member by the solvent mixture is achieved.

While there has been shown and described what is at present considered the preferred embodiments of the invention, it will be obvious to those skilled in the art that various changes and modifications may be made therein without departing from the invention as defined by the appended claims.

INDUSTRIAL APPLICABILITY

Thus, a unique process for fabricating cathodes for cathode ray tubes has been provided. The process permits utilization of self-supporting films of emissive materials with the inherent advantages of uniformity of thickness and ease of automation in cathode ray tube structures. Also, a solvent mixture is provided which is adapted to the above process and eliminates such known problems, as poor adherence, non-centering, densification and loose edges of the film.

We claim:

1. In a process for fabricating a cathode for a cathode ray tube wherein a drop of solvent mixture is deposited onto a cathode support member, the solvent mixture is contacted by a self-supporting film which includes a binder and the solvent mixture is preferentially evaporated to effect centering of said film on and attachment of said film to the cathode support member, an improved solvent mixture comprising:

at least two liquids miscible in all proportions with one liquid a non-solvent and another liquid higher boiling than said one liquid and a solvent for said binder of said self-supporting film.

2. The improved solvent mixture of claim 1 wherein said binder of said self-supporting film is soluble in one and essentially insoluble in the other of said two liquids.

3. The improved solvent mixture of claim 1 wherein one of the liquids is a non-solvent for said binder of said film and has a boiling temperature lower than the other liquid which is a solvent for said binder of said film.

4. The improved solvent mixture of claim 1 wherein one of said two liquids is water.

5. The improved solvent mixture of claim 1 wherein one of said two liquids is ethylene glycol monobutyl ether and said self-supporting film is an ethyl cellulose film.

6. The improved solvent mixture of claim 1 wherein one of said two liquids is a solvent for said binder of said self-supporting film, has a higher boiling temperature than the other of said two liquids, and slightly dissolves said binder of said film and affixes said film to said cathode support member.

7. The improved solvent mixture of claim 1 wherein one of said two liquids is water in the range of about 70 to 90% by weight of said mixture.

8. The improved solvent mixture of claim 1 wherein one of said two liquids is ethylene glycol monobutyl ether in the range of about 10 to 30% by weight of said mixture.

9. The improved solvent mixture of claim 1 wherein one of said two liquids is water and the other is ethylene glycol monobutyl ether and said self-supporting film is an ethyl cellulose film.

* * * * *